United States Patent
Gupta et al.

(10) Patent No.: US 7,733,834 B2
(45) Date of Patent: Jun. 8, 2010

(54) FRAME DETECTION METHOD FOR 802.11B/G BASED WLAN SYSTEMS

(75) Inventors: Parul Gupta, Rajasthan (IN); Shobha Ramaswamy, Bangalore (IN)

(73) Assignee: Ittiam Systems (P) Ltd., Bangalore, Karnataka (IN)

( * ) Notice: Subject to any disclaimer, the term of this patent is extended or adjusted under 35 U.S.C. 154(b) by 1309 days.

(21) Appl. No.: 11/182,377

(22) Filed: Jul. 15, 2005

(65) Prior Publication Data

US 2006/0013180 A1 Jan. 19, 2006

Related U.S. Application Data

(60) Provisional application No. 60/589,101, filed on Jul. 19, 2004.

(51) Int. Cl.
*H04W 4/00* (2009.01)
(52) U.S. Cl. .................. 370/338; 370/509
(58) Field of Classification Search .......... None
See application file for complete search history.

(56) References Cited

U.S. PATENT DOCUMENTS 7,295,601 B1 * 11/2007 Sinha et al. ............. 375/222

2004/0240486 A1 * 12/2004 Venkatesh et al. ........... 370/537
2005/0089087 A1 * 4/2005 Sheen et al. ............... 375/150
2005/0152317 A1 * 7/2005 Awater et al. .............. 370/338

* cited by examiner

*Primary Examiner*—Daniel J Ryman
*Assistant Examiner*—Tito Pham
(74) *Attorney, Agent, or Firm*—Prakash Nama; Global IP Services, PLLC

(57) ABSTRACT

A method (and algorithm) for detection of 802.11a and 802.11b frames in an 802.11 transmission, calculates DCC (delayed copy correlation) and LCC (local copy correlation) magnitudes and compares their normalized values with threshold values. When a signal is detected, (i.e., AGC locks) the algorithm checks for a valid 802.11a frame, and it exploits the DCC properties of the received symbols. Because of the repetitions of short preambles in received symbols, the DCC is high when the short preamble symbols are present. Further, 802.11b detection may be based on Barker correlation properties simultaneously. A counter array is maintained for each position in a Barker window, and is incremented if the normalized LCC of the incoming sequence with the Barker code exceeds a threshold. An 802.11b packet is declared if the maximum value of the counter array exceeds a predetermined number in a specified number of Barker windows.

12 Claims, 4 Drawing Sheets

FRAME DETECTION METHOD FOR 802.11B/G BASED WLAN SYSTEMS

RELATED APPLICATIONS

Benefit is claimed under 35 U.S.C. 119(e) to U.S. Provisional Application Ser. No. 60/589,101, entitled "Robust Frame Acquisition for 802.11b/g based WLAN Systems" by Parul Gupta et al, filed Jul. 19, 2004, which is herein incorporated in its entirety by reference for all purposes.

FIELD OF THE INVENTION

This invention relates generally to frame detection in signal transmission, and more particularly to 802.11b and 802.11a frame detection in 802.11g transmissions.

BACKGROUND OF THE INVENTION

WLAN (wireless local area networks) systems are indispensable forms of communication systems like other known and emerging wireless technologies. While all these technologies seek to cater the telecommunication needs of mobile users, they differ in scope, coverage bandwidth and quality of service. WLAN systems are governed by 802.11 standards and are very much sought after, and offer unique features that are different from the features of other wireless systems. As known, 802.11a is the wireless LAN standard for 5 GHz band transmissions based on OFDM (orthogonal frequency division multiplexing). It is noted that 802.11b systems are governed by the 802.11b standard for 2.4 GHz band and are based on DSSS/CCK (direct sequence spread band/complementary code keying. It is also noted that 802.11g is an enhancement over the 802.11b standard operating also in 2.4 GHz. 802.11g supports transmissions of both 802.11a and 802.11b frames in 2.4 GHz band giving a maximum data rate of 54 Mbps. In 802.11 transmissions, it is common to correlate the received signal with a delayed copy of itself for frame detection. However, in 802.11g systems which can support both 802.11a and 802.11b frames, delayed copy correlation (DCC) alone will result in false frame detection, particularly in multipath channel conditions. The correlation properties of 802.11b frames which use Barker sequences for the preamble are more robust than the correlation properties of 802.11a preamble sequence. Barker codes are a subset of PN sequences and have low correlation side lobes. A correlation side-lobe is the correlation of a code word with a time-shifted version of itself. It is to be noted that the timeline available for frame acquisition in 802.11a packets (8 microseconds) is much smaller than that available in 802.11b packets (56/128 microseconds).

802.11a and 802.11b frame detection schemes have been discussed independently in literature but rarely under the assumption of simultaneous co-existence of the two kinds of frames, which is the case in 802.11g systems. Schemes for distinguishing between 802.11a and 802.11b packets based on 0.8 microseconds and 1 microsecond based DCC can be deployed but such schemes would not be very robust, particularly in multipath channel conditions. In this context, reference may be had to the publication of Nov. 18, 2003 titled "Improving Efficiency When Detecting WLAN Preambles," authored by Richard Williams, and published in Communications Design. Other publications which may be referred to include: Timothy M. Schmidl and Donald C. Cox, Robust Frequency and Timing Synchronization for OFDM, IEEE Transactions on Communications, Vol. 45, No. 12, December 1997; and J. Heiskala and J. Terry, OFDM Wireless LANs: A Theoretical and Practical Guide, SAMS Publishing, 2002.

SUMMARY OF THE INVENTION

A major issue with frame detection in 802.11g systems is the timeline available for detection/acquisition. Barker correlation based 802.11b acquisition schemes can be very robust but take more time for making a decision than is available in an 802.11a preamble (less than 8 microseconds, considering timeline loss for AGC and front end processing). If the 802.11b acquisition processing were to start first on an 802.11a frame, by the time it declares a failure, it would be too late to start the 802.11a acquisition and synchronization processing. On the other hand, 802.11a acquisition schemes are not robust enough under severe multi-path channel conditions. For example, they often falsely acquire 802.11b frames. Taught herein are a method and algorithm to jointly exploit the correlation properties of both 802.11a and 802.11b frames to give a robust packet detection scheme for 802.11g systems.

An 802.11g frame detection algorithm should be able to correctly distinguish 802.11a packets from 802.11b packets. An embodiment of the present invention provides a robust scheme to achieve the foregoing objective. In a modification, the scheme can also be used for robust acquisition in 802.11b systems.

One embodiment of the invention resides in a frame identification method in an 802.11 wireless transmission including 802.11a and 802.11b frames, comprising the steps of: detecting a signal in said transmission; calculating a delayed copy correlation (DCC) value of received symbols till a predetermined time-out period and making a comparison of the calculated DCC value with a predetermined threshold $th_{dcc}$; declaring that there is an 802.11a frame detected when a certain number of DCC values, as a result of the comparison, exceeds said predetermined threshold $th_{dcc}$ in a window of consecutive DCC values; and, using a sliding local copy correlation (LCC) value with Barker sequence for identifying 802.11b packets if the LCC value exceeds another predetermined threshold $th_{lcc}$. The transmission comprises an 802.11g transmission, wherein the step of detecting a signal in the transmission may comprise locking of automatic gain control (AGC). Expediently, the step of calculating may further include using periodicity of Barker correlation peaks with a period of one microsecond to reject noise and interference.

A second embodiment of the invention resides in a frame detection method in multipath channel conditions in an 802.11 transmission which includes 802.11a and 802.11b frames, comprising: detecting a signal in said transmission; calculating DCC values till a timeout period and then comparing the calculated DCC values with a predetermined threshold $th_{dcc}$; declaring that there is a 802.11a frame detected when a certain number of DCC values exceed the said predetermined threshold $th_{dcc}$, in a window of consecutive DCC values; and, using periodicity of Barker sequence correlation peaks for identifying occurrence of 802.11b frames in the transmission. The method in the second embodiment might include the step of maintaining a counter for each position in a Barker window. Additionally, the method might include the step of comparing a normalized LCC of the incoming sequence of the transmission against a predetermined threshold $th_{lcc}$ and incrementing the counter if a normalized LCC of an incoming sequence with Barker code exceeds the threshold $th_{lcc}$. Expediently, the counter has an array, the method including the step of comparing a maximum value of the counter array against a threshold $th_{lcnt}$, and if the compared maximum value of the counter exceeds said threshold $th_{lcnt}$, then declaring an 802.11b packet. Exemplary values for the thresholds are $th_{lcc}$ is 1.5 and $th_{lcnt}$ is 2 when four Barker windows are considered for LCC.

Also taught herein are articles comprising a storage medium having instructions thereon which when executed by a computing platform result in execution of a method as recited above.

BRIEF DESCRIPTION OF THE DRAWING

A more detailed understanding of the invention may be had from the following description of embodiments, to be understood in conjunction with the accompanying drawings wherein.

DETAILED DESCRIPTION OF EMBODIMENTS

In the following detailed description of the various embodiments of the invention, reference is made to the accompanying drawings that form a part hereof, and in which are shown by way of illustration, specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is therefore not to be taken in a limiting sense, and the scope of the present invention is defined only by the appended claims and their equivalents.

Described hereinafter is an exemplary scheme and an algorithm for detection of 802.11a and 802.11b frames in a transmission which may be an 802.11g type of transmission.

Figure 1:
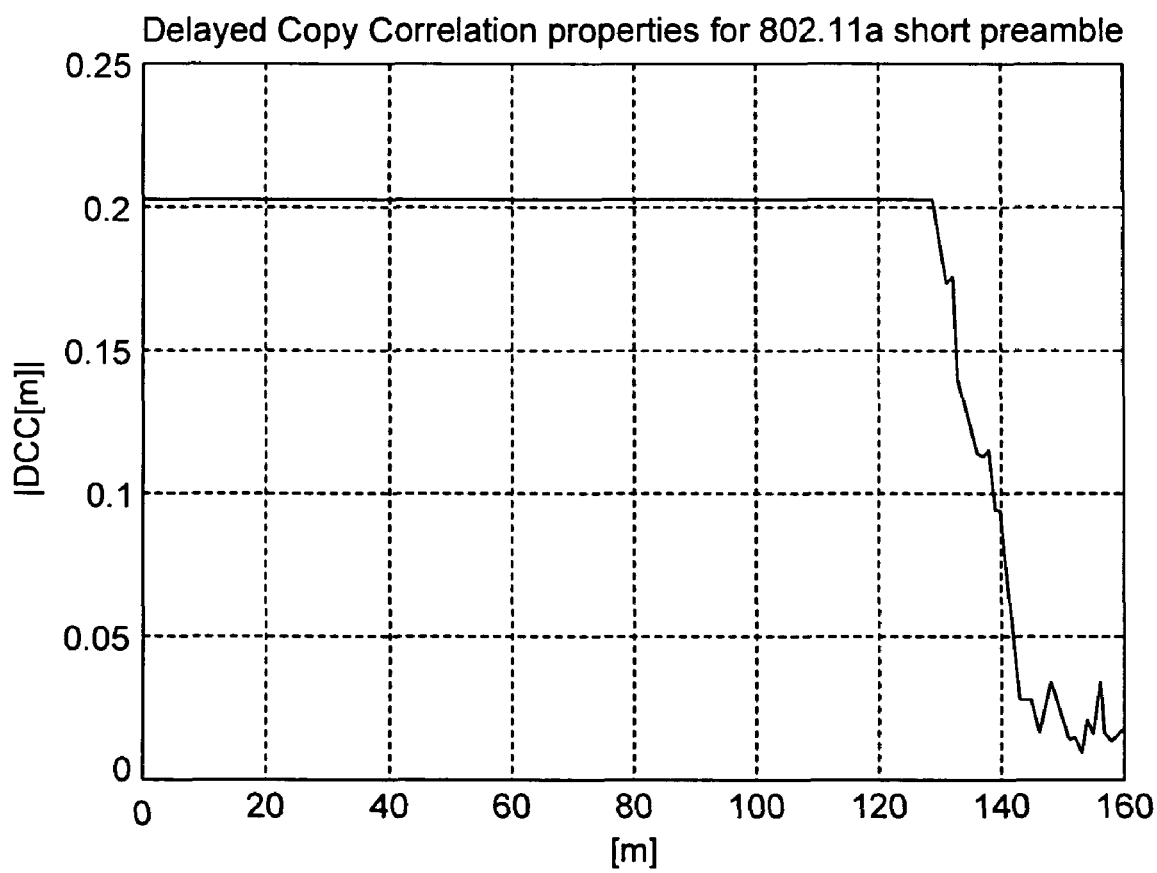
FIG. 1 shows the sliding DCC values computed on the 802.11a short preamble.

The proposed exemplary frame detection scheme does the following: When the presence of a signal is detected (i.e., automatic gain control (AGC) locks), the algorithm checks for a valid 802.11a frame. For this purpose, it exploits the delayed copy correlation (DCC) properties of the short preamble symbols. Because of the repetitions of short preambles, the DCC is high when the short preamble symbols are present. On the other hand, the DCC of white noise or any other signal has a small magnitude because of the absence of any such periodicity. It can be observed in FIG. 1 that the DCC values stay high for the duration of the short preamble.

DCC value can be obtained as, $$DCC[m] = \sum_{k=0}^{N_{SP}-1} R[m+k]R^*[m+k+N_{SP}]$$

$$P[m] = \frac{1}{2}\left(\sum_{k=0}^{N_{SP}-1} R[m+k]R^*[m+k] + \sum_{k=0}^{N_{SP}-1} R[m+k+N_{SP}]R^*[m+k+N_{SP}]\right)$$

where

R[k] are the received samples, * denotes the conjugate operation and Nsp is the length of Short Preamble symbol DCC[m] and P[m] are computed continuously over a sliding window till a timeout period.

If the normalized magnitude of the DCC, |DCC [m]|/P[m] exceeds a threshold $th_{dcc}$=0.5 at least a certain number of times, and $th_{dcnt}$=6 out of any T=8 consecutive correlations, an 802.11a frame is declared. As an enhancement, this threshold can be made dependent on SNR estimate.

Figure 2:
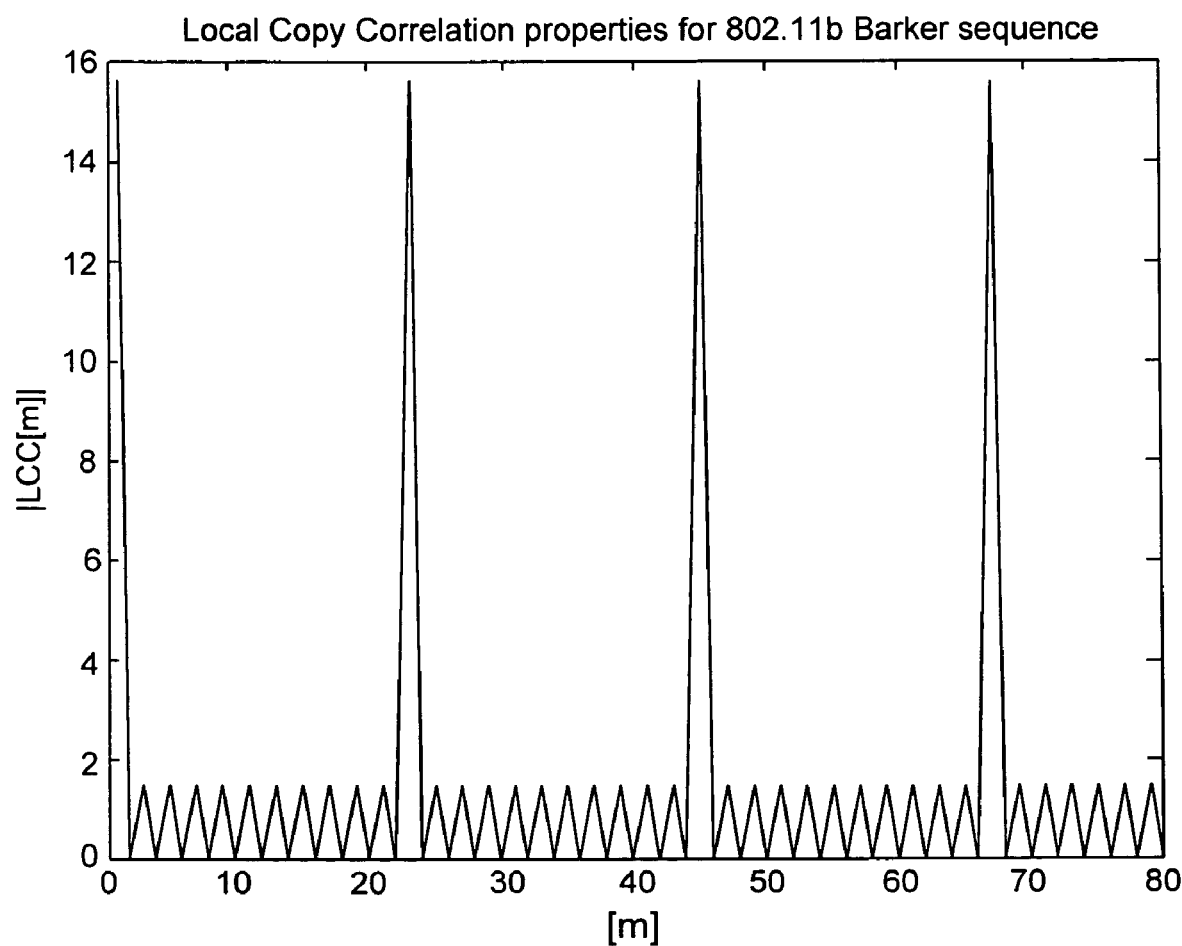
FIG. 2 shows the sliding LCC values computed on the 802.11b preamble comprising of Barker sequences.

The above method successfully detects all 802.11a frames but, might falsely acquire some 802.11b frames, especially under multipath channel conditions. Hence, in the event of frame detection, 802.11b frames need to be identified. For this, the Barker cross-correlation properties of 802.11b packets are exploited which can be seen in FIG. 2. The periodicity of the barker correlation peaks with a period of one microsecond is exploited to reject noise or any other interference, resulting in low false alarm rate and high probability of detection. The exemplary method is implemented as follows:

a. Sliding local copy correlation (LCC) of the incoming samples is performed with the Barker code. The LCC value is normalized with the power of the incoming samples.

$$LCC[m] = \sum_{k=1}^{N} R[m+k] * b^*[k]$$

$$P[m] = \sum_{k=1}^{N} R[m+k]R^*[m+k]$$

where, b * is the conjugate of the Barker code

Figure 3:
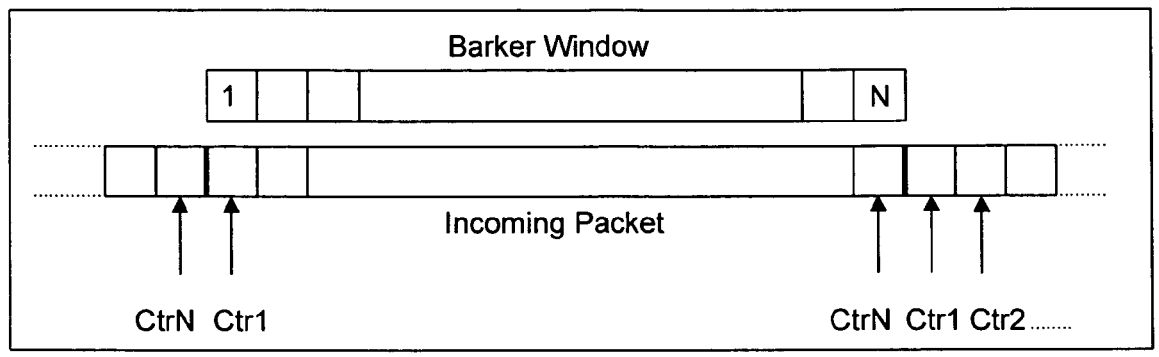
FIG. 3 illustrates sliding LCC of the received packet with Barker sequence and the method for maintaining a counter for each position in the Barker window for identifying 11b packets.

N is the length of Barker code.

b. In the exemplary embodiment described herein, a counter is maintained for each position in the Barker window (of length N) as shown in FIG. 3. LCC[m] is computed continuously in a sliding manner for num_corr times N values, where num_corr represents the number of Barker windows used. |LCC[m]|²/P[m] of the incoming sequence is compared against a threshold $th_{lcc}$=1.5 which is relative to the power in the corresponding samples and the counter is incremented if the |LCC[m]|²/P[m] exceeds $th_{lcc}$.

FIG. 3 illustrates sliding LCC of the received packet with Barker sequence and the method for maintaining a counter for each position in the Barker window for identifying 11b packets. In the context of FIG. 3, it is noted that the counters with index 1, 2, . . . N correspond to the position where the first sample of the Barker sequence overlaps with the indicated sample of the incoming packet in the LCC computation. N is the length of the Barker sequence.

c. This is done over num_corr windows and the maximum value of the counter array is compared against another threshold ($th_{lcnt}$<num_corr). If it exceeds, an 11b packet is declared and the system switches to corresponding processing.

d. The following exemplary values for the variable parameters are used for implementation:

Threshold LCC ($th_{lcc}$)=1.5
Threshold LCC Count ($th_{lcnt}$)=2
Number of Barker windows to be used (num_corr)=4

Figure 4:
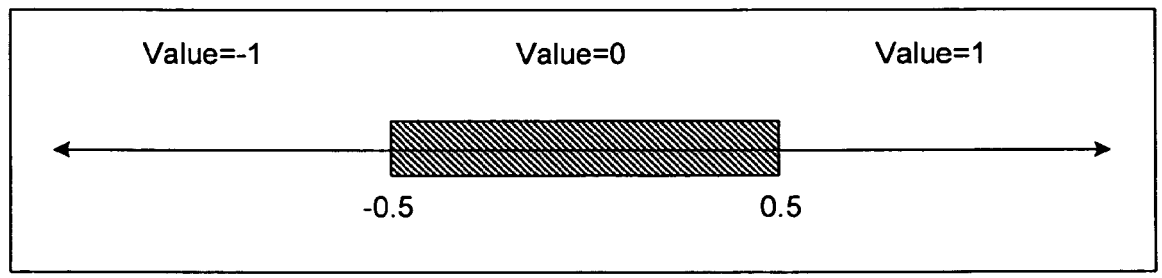
FIG. 4 shows exemplary quantization of the Barker sequence for a simpler implementation for values ranging from −1 to 1; and, FIG. 5 is a general purpose computing platform which may be used in practicing the invention.

For simplifying implementation, the Barker sequence may be quantized to −1, 0, 1 as shown in FIG. 4. This reduces the correlation operation to addition/subtraction and eliminates the need for complex multiplication operations.

The DCC for 802.11a frame detection and LCC for 802.11b frame detection are performed in parallel within the 802.11a timeline. In the event that both the 802.11a and 802.11b algorithms declare detection, priority is given to the 802.11b decision because of its robustness.

The Barker correlation part for identifying 11b packets in this scheme can be used for robust acquisition in 11b systems as well.

The foregoing is an exemplary method of identifying presence of 802.11a and 802.11b frames in an 802.11g transmission using the scheme taught herein. Also included in the ambit of the invention is an article comprising a storage medium having instructions thereon which when executed by a computing platform will result in execution of the methods recited and described hereinabove. It is understood that modifications in the method and article featured above may be made without departing from the thrust of the invention. All such modifications are envisaged to be within the ambit of the invention.

Figure 5:
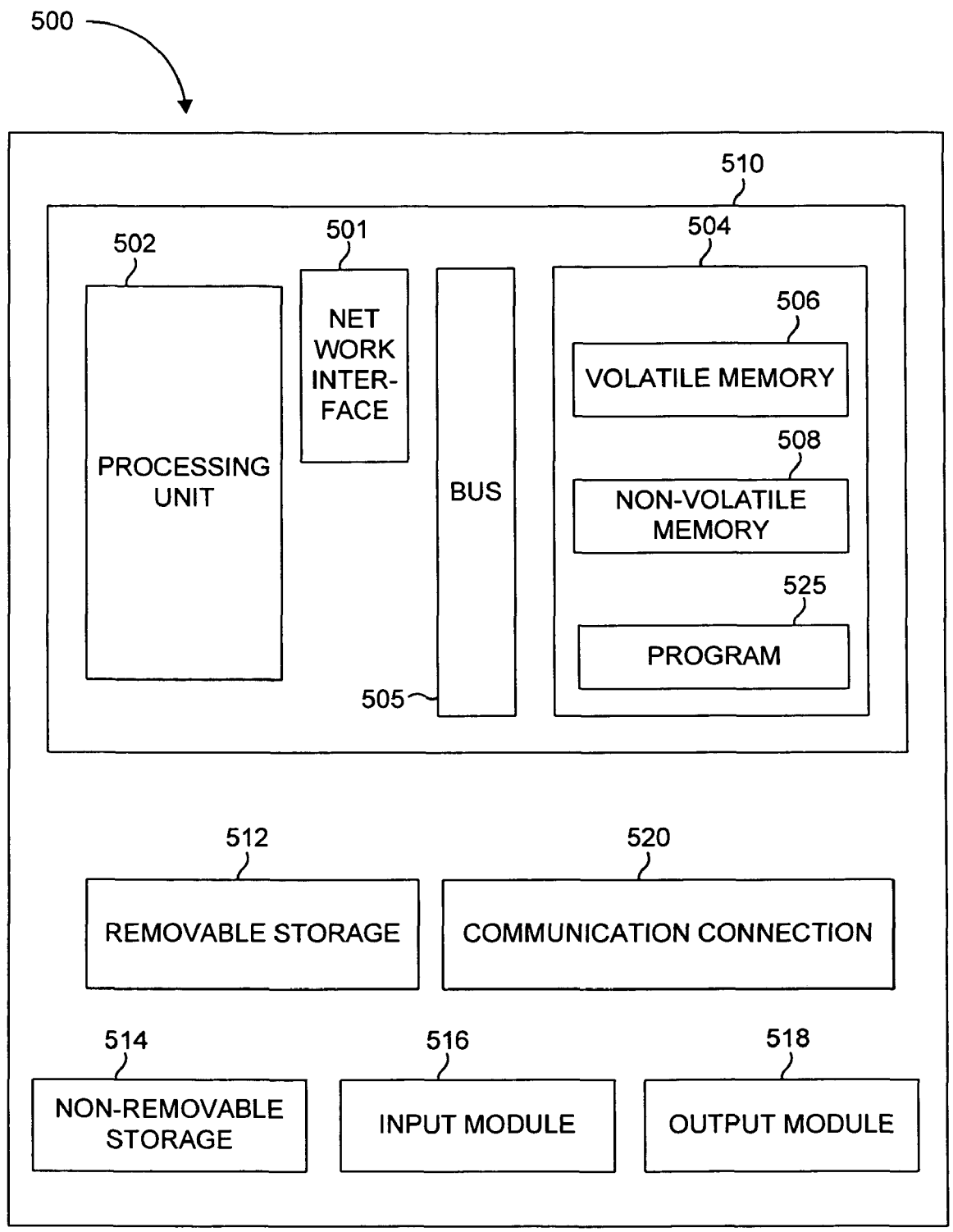

A general purpose computing platform may be deployed to implement the method described hereinabove. FIG. 5 shows an example of a suitable computing system environment for implementing embodiments of the present subject matter. FIG. 5 and the following discussion are intended to provide a brief, general description of a suitable computing environment in which certain embodiments of the inventive concepts contained herein may be implemented.

A general purpose computing device in the form of a computer 510 may include a processing unit 502, memory 504, removable storage 512, and non-removable storage 514. Computer 510 additionally includes a bus 505 and a network interface (NI) 501. Computer 510 may include or have access to a computing environment that includes one or more user input devices 516, one or more output modules or devices 518, and one or more communication connections 520 such as a network interface card or a USB connection. One or more user input devices 516 can be a touch screen and a stylus or the like. The one or more output devices 518 can be a display device of computer, computer monitor, TV screen, plasma display, LCD display, display on a touch screen, display on an electronic tablet, or the like. The computer 510 may operate in a networked environment using the communication connection 520 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 504 may include volatile memory 506 and non-volatile memory 308. A variety of computer-readable media may be stored in and accessed from the memory elements of computer 510, such as volatile memory 506 and non-volatile memory 508, removable storage 512 and non-removable storage 514. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like, chemical storage, biological storage, and other types of data storage.

"Processor" or "processing unit" as used herein, means any type of computational circuit, such as, but not limited to a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 502 of the computer 510. For example, a computer program 525 may include machine-readable instructions capable of detecting 802.11a and 802.11b frames in an 802.11g transmission according to the teachings of the described embodiments of the present subject matter. In one embodiment, the computer program 525 may be included on a CD-ROM and loaded from the CD-ROM to a hard drive in non-volatile memory 508. The machine-readable instructions cause the computer 510 to decode according to the various embodiments of the present subject matter.

The foregoing is the description of exemplary implementations of the method and apparatus for detection of 802.11b frames alone, or the occurrence of both 802.11a and 802.11b frames in an 802.11g transmission. The above-described implementation is intended to be applicable, without limitation, to situations where frame detection needs to be performed. The description hereinabove is intended to be illustrative, and not restrictive.

The various embodiments of the model described herein are applicable generally to any system wherein frames containing known training sequences with specific correlation properties need to be detected, and the embodiments described herein are in no way intended to limit the applicability of the invention. In addition, the techniques of the various exemplary embodiments are useful to the design of any hardware implementations of software, firmware, and algorithms in the context frame detection in general. Many other embodiments will be apparent to those skilled in the art. The scope of this invention should therefore be determined by the appended claims as supported by the text, along with the full scope of equivalents to which such claims are entitled.

The invention claimed is:

1. A frame detection method in multipath channel conditions in an 802.11 transmission which includes 802.11a and 802.11b frames, comprising:
    detecting a signal in said transmission, wherein the detected signal includes symbols;
    calculating DCC (delayed copy correlation) values of the received symbols until an end of a timeout period;
    normalizing the calculated DCC values with power of incoming samples in the transmission;
    comparing the normalized DCC values with a predetermined threshold $th_{dcc}$;
    declaring that there is a 802.11a frame detected when a certain number of DCC values, $th_{dcnt}$, exceeds said predetermined threshold $th_{dcc}$ in a window of T consecutive DCC values; and,
    using periodicity of Barker sequence correlation peaks for identifying occurrence of 802.11b frames in the transmission, wherein identifying the occurrence of 802.11b frames comprises:

performing a sliding local copy correlation (LCC) of the
incoming samples in the transmission with the Barker
sequence;

normalizing the LCC values with power of the incoming
samples;

considering a Barker window of the normalized LCC
values at a time, wherein the Barker window corresponds to length of the Barker sequence;

comparing the normalized LCC values of the incoming
samples of the transmission against a predetermined
threshold $th_{lcc}$;

maintaining a counter having an array corresponding to
each position in the Barker window, wherein the
counter comprises the array equal to the length of the
Barker sequence;

incrementing the counter at the position corresponding
to the normalized LCC value of the incoming
sequence with Barker code which exceeds said
threshold $th_{lcc}$;

repeating the steps of comparing and incrementing for
num_corr Barker windows, wherein the num_corr
represents the number of the Barker windows used;
and comparing a maximum value of the counter array
against a predetermined threshold $th_{lcnt}$, and if the
compared maximum value of the counter array
exceeds said threshold $th_{lcnt}$ in a predetermined number of Barker windows num corr, then declaring an
802.11b packet.

2. The method as in claim 1, wherein the threshold $th_{lcc}$ is 1.5, the threshold $th_{lcnt}$ is 2, the num_corr is 4, the $th_{dcc}$ is 0.5, the $th_{dcnt}$ is 6 and the T is 8.

3. The method as in claim 1, wherein at least one of said thresholds is made to be dependent on a signal to noise ratio (SNR) estimate.

4. The method as in claim 1, wherein, if 802.11a detection passes and 802.11b detection also passes, including the step of giving priority to the 802.11b detection.

5. The method as in claim 1, wherein, the Barker sequence is quantized to −1, 0, 1, and wherein a correlation operation is reduced to addition/subtraction.

6. The method as in claim 1, wherein the normalized LCC value of an incoming sample m is given as $$|LCC[m]|^2 / P[m]$$

wherein, LCC[m] is local copy correlation value of the incoming sample m and P[m] is the power of the incoming sample m.

7. The method as in claim 6, wherein the LCC[m] and the P[m] are computed using the equations:

$$LCC[m] = \sum_{K=1}^{N} R[m+k] * b^*[k], \text{ and}$$

$$P[m] = \sum_{K=1}^{N} R[m+k]R^*[m+k]$$

wherein, R[k] are the received incoming samples, *
denotes conjugate operation, b is the Barker sequence
and N is the length of the Barker sequence.

8. The method as in claim 1, wherein normalized DCC value of an incoming sample m is given as $$|DCC[m]| / P[m]$$

wherein, DCC[m] is delayed copy correlation value of the
incoming sample m and P[m] is the power of the incoming sample m.

9. The method as in claim 8, wherein the DCC[m] and P[m] are computed using the equations:

$$DCC[m] = \sum_{k=0}^{N-1} R[m+k]R^*[m+k+N]$$

$$P[m] = \frac{1}{2}\left(\sum_{k=0}^{N-1} R[m+k]R^*[m+k] + \sum_{k=0}^{N-1} R[m+k+N]R^*[m+k+N]\right)$$

wherein, R[k] are the received incoming samples, *
denotes conjugate operation, and N is the length of short preamble sequence.

10. A method of identifying 802.11b packets in a signal transmission, comprising the steps of:

detecting a signal in the transmission by using locking of
automatic gain control (AGC); and, declaring an 802.11b packet using a sliding local copy
correlation (LCC) value with Barker sequence, wherein the step of declaring is done when said LCC value
with Barker sequence, normalized relative to the average
power exceeds a predetermined threshold, $th_{lcc}$, and
wherein the step of declaring comprises:

performing a sliding local copy correlation (LCC) of
incoming samples in the transmission with the Barker
sequence;

normalizing the LCC values with power of the incoming
samples;

considering a Barker window of the normalized LCC
values at a time, wherein the Barker window corresponds to length of the Barker sequence;

comparing the normalized LCC values of the incoming
samples of the transmission against a predetermined
threshold $th_{lcc}$;

maintaining a counter having an array corresponding to
each position in the Barker window, wherein the
counter comprises the array equal to the length of the
Barker sequence;

incrementing the counter array at the position corresponding to the normalized LCC value of the incoming sequence with the Barker sequence which exceeds
the predetermined threshold $th_{lcc}$;

repeating the steps of comparing and incrementing for
num_corr Barker windows, wherein the num_corr
represents the number of the Barker windows used;
and comparing a maximum value of the counter array
against a predetermined threshold $th_{lcnt}$, and declaring an 802.11b packet, if the maximum value of the
counter array exceeds the predetermined number $th_{lcnt}$ in the specified number of Barker windows.

11. An article comprising a storage medium with instructions thereon which when executed by a computing platform result in execution of a frame identification method in a wireless transmission, as in claim 10.

12. An article comprising a storage medium with instructions thereon which when executed by a computing platform result in execution of a frame detection method in an 802.11 transmission which includes 802.11a and 802.11b frames in multipath conditions, the frame detection method being as in claim 1.

* * * * *